United States Patent [19]

De Vasselot et al.

[11] Patent Number: 4,729,779
[45] Date of Patent: Mar. 8, 1988

[54] METHOD AND APPARATUS FOR MANUFACTURING GLASS ARTICLES

[75] Inventors: Bruno De Vasselot, Woodridge; Anthony J. Massela, Chicago, both of Ill.

[73] Assignee: Liquid Air Corporation, Walnut Creek, Calif.

[21] Appl. No.: 40,075

[22] Filed: Apr. 20, 1987

[51] Int. Cl.[4] .......................... C03B 9/36; C03B 9/38
[52] U.S. Cl. .................................. 65/84; 65/81; 65/85; 65/161; 65/262; 65/355
[58] Field of Search .................. 65/81, 83, 84, 85, 62, 65/69, 161, 261, 262, 355

[56] References Cited

U.S. PATENT DOCUMENTS

| Re. 28,497 | 7/1975 | Gasmire | 65/137 X |
|---|---|---|---|
| 2,198,749 | 4/1940 | Weber | 65/348 |
| 3,224,860 | 12/1965 | Stinnes | 65/355 |
| 3,350,189 | 10/1967 | Nowak | 65/84 |
| 3,416,908 | 12/1968 | Goodwin et al. | 65/161 X |
| 4,553,999 | 11/1985 | Ziegler et al. | 65/84 |
| 4,555,258 | 11/1985 | Curiel | 65/355 X |
| 4,652,292 | 3/1987 | Ziegler et al. | 65/84 |

*Primary Examiner*—Arthur Kellogg
*Attorney, Agent, or Firm*—Lee C. Robinson, Jr.

[57] ABSTRACT

According to the invention, a cryogenic liquid as liquid oxygen is vaporized in a heat exchanger by air, which air is thus cooled and further used to blow bottles or the like manufactured at the end of the line where glass is melted and refined by burners using the gaseous oxygen.

17 Claims, 1 Drawing Figure

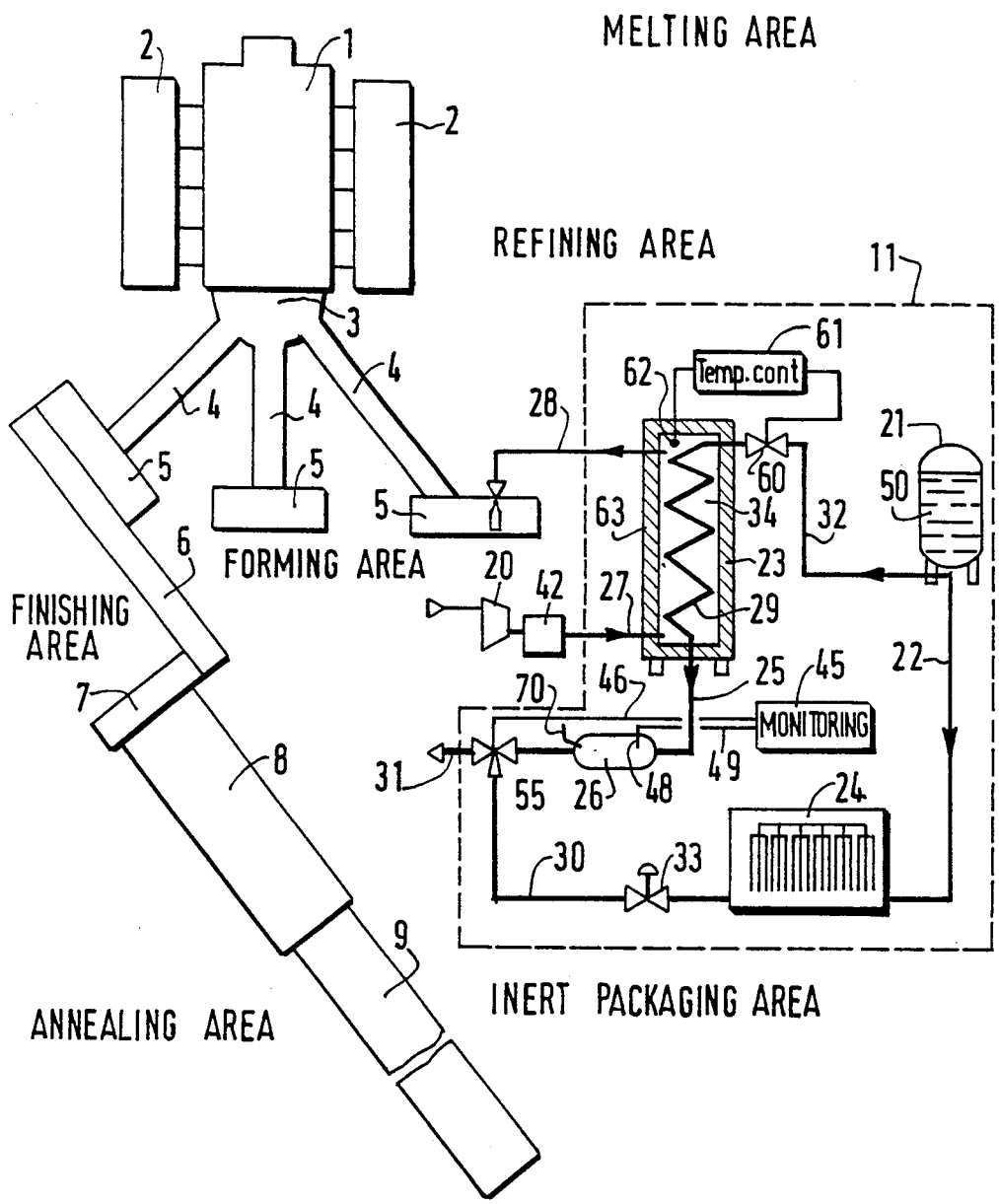

METHOD AND APPARATUS FOR MANUFACTURING GLASS ARTICLES

BACKGROUND OF THE INVENTION

1. Field of the Invention

The present invention relates to the manufacture of molded glass articles such as bottles, and the like and more particularity to the use of blow molding gases cooled in a heat-exchanger by a cryogenic fluid which is thus vaporized and recovered to be used in another step of the manufacture of said molded glass articles.

2. Prior Art :

In the manufacture of molded glass articles, such as bottles and the like, a bath of molten glass is typically made in a melting furnace using generally but not necessarily air fuel burners or in some instances, oxygen enriched air burners, or oxy-fuel burners to maintain the glass in a molten state. Said molten glass is refined in a refining station and then conveyed in at least one forehearth connected to a forming machine in which hollow glass articles are formed and blown. Then the articles are transferred on conveyor belts to a lehr. After annealing, said articles are packed in a packaging station. In some instances, said articles are filled with liquid, inerted and sealed prior to their transfer to the packinging station.

In the forming station, it is conventional to use a cooling medium to cool the blank molds in which a parison of glass is formed and the finishing molds in which it is expanded to the desired final shape. Such a cooling medium is usually compressed air at a temperature of ambient air or higher. This compressed air is injected inside the freshly molded articles to blow them and hasten their solidification. The hollow articles are removed as quickly as possible from their molds and then placed on a conveyor belt to be flame-polished, if necessary.

A process of this type is disclosed in U.S. Pat. No. 3,233,416, Rainwater et al. The air is carried through a vortex tube and thus cooled, said air being used as blowing air and for cooling air that is supplied to a jacket surrounding the mold cavity.

However, this system has several drawbacks : Air is first dryed, then compressed and then cooled in a heat exchanger and then conducted through a pipe in the vortex tube, said tube separating the supplied air into hot and cold fractions, the hot fraction being recycled through a second heat exchanger which is connected to an air storage tank. The cold fraction injected through a pipe is used firstly to blow (and cool) the parison against the wall of the mold cavity, said fraction being discharged at a temperature of about 20° F. and secondly, after escaping from the mold cavity, to cool the said pipe or at least insulate it, while said air is still at a substantially lower temperature than atmospheric temperature.

It is clear, from this brief description, that this system is complicated, whith a least two heat exchangers and a vortex device in the pipe between the source of compressed air and the mold cavity and has also a poor output, namely because an important part of the compressed air is heated in said vortex device.

More recently, it has been proposed in U.S. Pat. No. 4,553,999 to use cold cryogen vapors or a mixture with air to blow the cool hollow glass articles to hasten their solidification. However, the use of a continuous injection of cold cryogen vapors generates ice crystals which rapidly block up the injection pipe through which the vapors are blown.

SUMMARY OF THE INVENTION

The present invention overcomes the foregoing drawbacks of the various systems of the prior art by providing an improved system utilizing a flow of pressurized air which has been previously cooled preferably between about 0° F. to 40° F. in a heat exchanger. A cryogenic liquid from a cryogenic storage vessel is vaporized in said heat exchanger. The vaporized gas is further used in one or several stations of the manufacturing line of hollow glass articles, such as melting, refining, forming, finishing, annealing and/or packaging. The absence of direct contact between the pressurized air and the cryogenic liquid avoid any problem of regeneration back and forth of the injection pipe, due to the presence of ice crystals of the prior art practice.

The glass industry is a big user of energy : about 80% of their energy usage is generated through the combustion of natural gas for melting, refining, forming, finishing and annealing glass.

Said combustion of natural gas is made with air and/or oxygen.

In some particular steps like flame polishing of the molded articles, if any, it is known from U.S. Pat. No. 4,576,572 incorporated herein as a reference to use a flame of oxygen and a fuel gas, namely hydrogen.

It is also known from U.S. Pat. No. 4,531,960, incorporated herein as a reference, to use oxy-fuel burners to heat the forehearths in the melting station.

In the step of forming the hollow glass articles either by the press and blow or blow and blow process, it is known from U.S. Pat. No. 4, 412,974 incorporated herein as a reference to use oxy-fuel burners in which a hydrocarbon, such as acetylene, is injected to produce carbon black, said carbon black being used to lubricate the glass molds.

In these different processes, oxygen and hydrogen are generally stored in liquid state in cryogenic storage vessels. These cryogenic fluids need to be vaporized in gaseous state to be further used in the corresponding burners.

In some manufacturing plants of hollow glass articles such as bottles or the like, said bottles are filled with liquid beverages as soon as the bottles are made or later. To avoid oxidation or any undesired reactions of said beverages with air, it is a common practice to inert the beverage by introducing over the liquid level an inert gas like nitrogen and close the bottles. Said nitrogen is also stored, generally in liquid state before using it to inert said beverage. The aim of the invention is to reduce the cooling and energy costs in the manufacture of glass articles.

The process, according to this invention, makes use of the liquid and gaseous properties of the cryogenic fluids. The cryogenic fluid cools the compressed air to a pre-set temperature. The cooled compressed air is used to blow hollow glass articles or the like in the blow molding process. Simultaneously, the calories of the "hot" compressed air vaporized the cryogenic fluid and this vaporized gas is used in one or several stations of the manufacturing line of said hollow glass articles.

The cryogenic fluid (liquid $O_2$ and/or liquid $N_2$ and/or liquid $H_2$) used in said installation, will depend on the vaporized gas need in the production manufacturing line. Generally, oxygen is the preferred cryogenic fluid.

BRIEF DESCRIPTION OF THE DRAWING

Other and further features of the invention will be clearly understood by referring to the following description of a preferred embodiment of said invention which has been chosen for purpose of illustration, along with the claims and the accompanying drawing which is a schematic view illustrating a manufacturing line of hollow glass articles using the process according to the invention.

DESCRIPTION OF THE PREFERED EMBODIMENT

Referring to the figure of the drawing, the system according to one embodiment of the invention comprises a melting furnace 1 with two checkers 2, a refiner 3 where melted glass from the melting furnace is refined. The molten glass is then conveyed in a plurality of forehearth 4 towards forming machines 5 where a parison of molten glass is continuously formed by gravity through an opening after which it is cut in pieces of parison and sent sequentially to the various blank molds of the forming machine where it is pressed or blown, then shaped in the finishing mold where it is pressed but generally blown when the final article is a hollow article.

Then the article is extracted from the finishing mold and wait in idle state before to be put on the conveyor belts 6, 7 where it reaches the input of a lehr 8, where the glass articles are generally annealed. In most cases, the glass articles after being controlled to check their quality, are packaged in the packaging area 9 to be further delivered to the clients. However, in some cases of manufacturing hollow glass articles like bottles, the manufacturing line further comprises means for filling the hollow articles with beverage, then inerting the beverage by injection of an inert gas above the level of the beverage and then closing the hollow articles after which they are package together.

In this type of manufacturing lines of glass articles, namely hollow glass articles like bottles, it is known to blow compressed air about the mold and/or inside the walls of the molds and/or inside the hollow articles to blow and/or cool said articles interiorly. According to the usual technique, the compressed air (or gas) is taken from ambient air, then compressed and sent in or around the mold. This compressed air is thus at a temperature of ambient air or higher. It is well known from the man skilled in the art that there is a need to cool this air in order to hasten solidification of the walls to form a chilled skin of colder and less plastic glass on its outside surface, and in case of hollow articles, also on its inside surface, to hold the shape of the parison after it has been removed from the press and/or blow machine, preventing the hotter and more plastic interior from running out of shape (see for example U.S. Pat. No. 1,673,747). However no economical solution has been proposed to this aim.

On the other hand, gases like oxygen, hydrogen and/or nitrogen are used or can be used in the different steps of manufacturing glass articles.

For example, in the melting area (1,2) oxygen enriched air with oxygen injected with lances or oxy-fuel burners are used, as well as in the refining area (3,4). In the forming area, as well as in the finishing area and annealing area, oxygen and/or hydrogen can be used for sooting the molds, the conveyor belt or for flame polishing the articles. In some instances, nitrogen is used in the inert packaging area (9). In all cases, oxygen and/or hydrogen and/or nitrogen are stored in liquid state and there is a need to vaporize said cryogenic liquids before using them in the corresponding steps of the process. The system of the invention provides cooling of the compressed air (or gas) by heat exchange contact between said air and said cryogenic liquid and simultaneously provides the vaporization of said cryogenic liquids to be further used in the said corresponding steps. The system is illustrated by reference 11 on the FIGURE of the drawing. There is of course in practice at least one system 11 for each type of cryogenic liquid, i.e. at least two systems if at least two different cryogenic liquids are used in the manufacturing line, namely oxygen and hydrogen, or at least three if all three oxygen, hydrogen and nitrogen are used. It could also be necessary for economical reasons to provide only one system 11, namely with liquid oxygen storage, to cool the air for the whole set of forming machines (three illustrated on the figure) or one for each machine, namely with the same cryogenic storage vessel 21 or different vessels. For purpose of illustration, only one system 11 has been represented to cool air for only one forming machine, but the various embodiments hereabove disclosed are encompassed within the present invention.

System 11 comprises a heat exchanger having an housing 23, namely cylindrical, with isolating walls 63, at the bottom of which is provided a duct 27 connected to an air compressor 20 through an air dryer 42. The duct traverses the isolating wall 63 to form a port through which compressed dried air can escape into the inside portion 34 of the housing 23. Compressed cooled air escapes through the port at the end of duct 28 which traverses the isolating wall 63 at the top of the housing 23, to cool the molds and/or blow the articles in the forming machine.

The heat exchanger further comprises a duct 29 connected, about the top of the heat exchanger, through the wall 63 of the housing 23, to a solenoid valve 60 which in turn in connected via duct 32 to the bottom of the storage vessel 21 containing the cryogenic liquid 50. The duct 29, namely an helical duct, traverses the bottom wall of the housing 23 and is connected, via the duct 25 to the surge tank 26, storing the vaporized gas from the cryogenic liquid which in turn is connected to the first way of a three ways solenoid valve 55. The storage vessel 21 is connected by the duct 22, from the bottom of said vessel to a vaporizer 24 which in turn is connected via a pressure regulator 33 and the duct 30 to the second way of the three way solenoid valve 55, the third way of which (output) is in turn connected via the duct 31 to the related apparatus (one or several using the said vaporized gas, as lances, burners, and the like ...)

A monitoring system 45 controls the opening or closing (respectively) or vice versa of the first and second ways of the three way valve 55. The monitoring method is based here (but several different monitoring systems known per se can be defined to fulfill the requirements) on a pressure sensing device 48 which senses the pressure of gas inside the surge tank 26. This pressure is compared to a first predetermined value in the said monitoring system.

When the sensed pressure is at least equal to or greater than this first predetermined value, the first way is opened and second way closed via an electric signal from the monitoring system 45 on the line 46 to the solenoid valve 55 and then vaporized gas from the surge tank is sent viaduct 31 to the manufacturing line.

When the sensed pressure is lower than the first predetermined value, the second way is opened (and the first way closed) via an electric signal from the monitoring system 45 on the line 46 to the solenoid valve 55. The vaporized gas from the vaporizer 24 is thus sent viaducts 30 and 31 to the manufacturing line. In any cases, vaporized gas is provided to the manufacturing line where a demand exists.

When the pressure in the surge tank 26 is higher than a second predetermined valve (which is higher than the first one), the pressure relief valve 70 is opened and the vaporized gas vented in the atmosphere, up to the decrease to said second predetermined value, where said pressure relief valve is closed.

On the other hand, the temperature of the "cooling air" is sensed by the temperature sensor 62 connected to the temperature controller 61 comprising a regulation device, namely, of the P.I.D. type which is responsive to the signal of the temperature sensor 62 and which induces an electric signal to the solenoid valve 60 of the proportionnal type to open or close more or less the port between the ducts 32 and 29, in order to increase or decrease respectively the flow of cryogenic liquid, and thus the heat exchange capacity between both fluids. If the temperature of the cooling gas is too high at the output 28 then the flow rate of cryogenic liquid is increased while if the temperature of the cooling gas is too low, the flow rate of said cryogenic gas is decreased.

The indirect heat exchange contact according to the invention (i.e. with no direct contact between both fluids, a wall always separating them) has several advantages compared to the direct heat exchange contact. Among others, this indirect heat exchange contact allows to recover the vaporized gas from the cryogenic liquid (with the same purity), to have an homogenous temperature of the cooling gas, which is about the same in the whole gas ejected out of the heat exchanger (contrary to direct contact where the temperature is non homogenous, particulary when cold cryogenic vapors are sequentially injected in the bottle, generating bottles of uneven quality, depending on the sequence—air or cryogenic vapors.) and to enhance the output of the cryogenic liquid by placing the heat exchanger in the vicinity of the storage vessel (contrary to direct exchange where cryogenic liquid has to be injected at the end of the manufacture line, where the bottle is blown.)

We claim:

1. A process for the production of glass molded articles comprising the steps of forming and/or expanding a quantity of molten glass in a mold cavity to conform its wall to the contour of said mold, providing a flow of pressurized cooling gas to cool the internal and/or external walls of the formed and/or expanded glass article, said cooling gas being cooled by indirect heat exchange contact with a cryogenic liquid chosen among liquid oxygen and/or liquid nitrogen and/or liquid hydrogen, wherein it further comprises the step of vaporizing said cryogenic liquid by maintaining an appropriate indirect heat exchange contact with said cooling gas, then recovering the cryogenic gas vaporized from said cryogenic liquid and further using the vaporised cryogenic gas in at least one of other steps for the production of said glass molded articles.

2. A process for the production of glass molded articles comprising the steps of manufacturing a bath of molten glass by heating said glass with at least one oxygen enriched air-fuel burner, forming and/or expanding a quantity of molten glass in a mold cavity to conform its wall to the contour of said mold, providing a flow of pressurized cooling gas to cool the internal and/or external walls of the formed and/or expanded glass article, said cooling gas being cooled at least partly by indirect heat exchange contact with liquid oxygen, wherein it further comprises the step of vaporizing said liquid oxygen by maintaining an appropriate indirect heat exchange contact with said cooling gas, then recovering said vaporized oxygen to use it at least partly in said at least one oxygen enriched air-fuel burner.

3. A process according to claim 2, wherein oxygen enriched air in the said at least one burner is replaced by pure oxygen.

4. A process for the production of glass molded articles comprising the steps of manufacturing a bath of molten glass, refining said molten glass with at least one oxygen enriched air-fuel burner, forming and/or expanding a quantity of molten glass in a mold cavity to conform its wall to the contour of said mold, providing a flow of pressurized cooling gas to cool the internal and/or external walls of the formed and/or expanded glass article, said cooling gas being cooled at least partly by indirect heat exchange contact with liquid oxygen, wherein it further comprises the step of vaporizing said liquid oxygen by maintaining an appropriate indirect heat exchange contact with said cooling gas, then recovering said vaporized oxygen to use it at least partly in said at least one oxygen enriched air-fuel burner.

5. A process according to claim 3, wherein oxygen enriched air in the said at least one burner is replaced by pure oxygen.

6. A process for the production of glass molded articles comprising the steps of forming and/or expanding a quantity of molten glass in a mold cavity to conform its wall to the contour of said mold, providing a flow of pressurized cooling gas to cool the internal and/or external walls of the formed and/or expanded glass article, sooting the mold cavity with at least one oxy-fuel burner through the flame of which is injected a fluid generating carbonaceous particles by cracking, said cooling gas being cooled at least partly by indirect heat exchange contact with liquid oxygen, wherein it further comprises the step of vaporizing said liquid oxygen by maintaining an appropriate indirect heat exchange contact with said cooling gas, then recovering said vaporized oxygen to use it at least partly in said at least one oxy-fuel burner.

7. A process for the production of glass molded articles comprising the steps of forming and/or expanding a quantity of molten glass in a mold cavity to conform its wall to the contour of said mold, providing a flow of pressurized cooling gas to cool the internal and/or external walls of the formed and/or expanded glass article, polishing the surface of the formed and/or expanded glass article with at least one oxyfuel burner, said cooling gas being cooled at least partly by indirect heat exchange with liquid oxygen, wherein it further comprises the step of vaporizing said liquid oxygen by maintaining an appropriate indirect heat exchange contact with said cooling gas, then recovering said vaporized oxygen to use it at least partly in said at least one oxyfuel burner.

8. A process according to claim 7, wherein said fuel in said oxyfuel burner is hydrogen.

9. A process for the production of glass molded articles comprising the steps of forming and/or expanding a quantity of molten glass in a mold cavity to conform its wall to the contour of said mold, providing a flow of pressurized cooling gas to cool the internal and/or external walls of the formed and/or expanded glass article, polishing the surface of the formed and/or expanded glass articles with at least one oxygen-hydrogen burner, said cooling gas being cooled at least partly by indirect heat exchange with liquid hydrogen, wherein it further comprises the step of vaporizing said liquid hydrogen by maintaining an appropriate indirect heat exchange contact with said cooling gas, then recovering said vaporized hydrogen to use it at least partly in said at least one oxygen-hydrogen burner.

10. A process according to claim 9, said cooling gas being cooled at least partly by indirect heat exchange with liquid oxygen, wherein it further comprises the step of vaporizing said liquid oxygen by maintaining an appropriate indirect heat exchange contact with said cooling gas, then recovering said vaporized oxygen to use it at least partly in said at least one oxygen-hydrogen burner.

11. A process for the production of glass molded articles comprising the steps of forming and/or expanding a quantity of molten glass in a mold cavity to conform its wall to the contour of said mold, providing a flow of pressurized cooling gas to cool the internal and/or external walls of the formed and/or expanded glass article, conveying the formed and/or expanded glass articles on a conveyor belt, sooting said conveyor belt with at least one oxy-fuel burner through the flame of which is injected a fluid generating carbonaceous particles by cracking, said cooling gas being cooled at least partly by indirect heat exchange contact with liquid oxygen, wherein it further comprises the step of vaporizing said liquid oxygen by maintaining an appropriate indirect heat exchange contact with said cooling gas, then recovering said vaporized oxygen to use it at least partly in said at least one oxy-fuel burner.

12. A process for the production of glass molded articles comprising the steps of forming and/or expanding a quantity of molten glass in a mold cavity to form a hollow glass article and conform its wall to the contour of said mold, provinding a flow of pressurized cooling gas to cool the internal and/or external walls, partly filing the hollow glass article with a beverage, inerting said beverage by introducing over the liquid level an inert gas, closing the hollow glass articles, said cooling gas being cooled at least partly by indirect heat exchange contact with an inert liquid, wherein it further comprises the step of vaporizing said inert liquid gas by maintaining an appropriate indirect heat exchange contact with said cooling gas, then recovering said vaporized inert gas to use it at least partly in said inerting step.

13. A process according to claim 1, wherein the cooling gas is air which is compressed and then dried before the cooling step.

14. A process according to claim 1 wherein it further comprises the step of vaporizing a cryogenic liquid chosen among liquid oxygen, liquid hydrogen and/or liquid nitrogen in a conventionnal way to obtain a cryogenic gas and then further using it in at least one of the other steps for the production of said glass molded articles.

15. An installation for the production of molded glass articles which are pressed and/or blown comprising means for forming and/or expanding a quantity of molten glass in a mold cavity to conform its wall to the contour of said mold, means for blowing cooled air about the mold and/or the glass article walls, means for compressing air, means for drying the compressed air, heat exchanging means for cooling the compressed air before delivering it to the said means for cooling the compressed air before delivering it to the said means for blowing cooled air, means for storing a cryogenic liquid chosen among oxygen, nitrogen and/or hydrogen, means for using a gas chosen among oxygen gas and/or nitrogen gas and/or hydrogen gas, wherein said means for storing a cryogenic liquid are connected to said heat exchanging means which comprises at least one duct adapted to receive the cryogenic liquid at the inlet of the duct connected to said means for storing a cryogenic liquid and to deliver gas at the outlet of said duct which is connected to said means for using a gas.

16. An installation according to claim 15, wherein it further comprises a surge tank to store the vaporized gas, connected between the outlet of said duct and said means for using a gas, pressure sensing means to detect the pressure inside the surge tank and adapted to generate a signal when the pressure of the gas inside the surge tank is lower than a first predetermined value.

17. An installation according to claim 16, comprising vaporizer means connected to said means for storing a cryogenic liquid, a solenoid valve connected at the output of the vaporizer, monitoring means to monitor the gas demand from the means for using a gas and mixing means adapted to inject to the means for using a gas, either vaporized gas from the heat exchanging means or a vaporized gas from the vaporizing means, wherein said monitoring means are responsive to the signal generated by the pressure sensing means to open, respectively close, the solenoid valve when the pressure measured by the pressure sensing means is lower, respectively greater, than the first predetermined pressure.

* * * * *

UNITED STATES PATENT AND TRADEMARK OFFICE
CERTIFICATE OF CORRECTION

PATENT NO. : 4,729,779

DATED : March 8, 1988

INVENTOR(S) : Bruno De Vasselot and Anthony J. Masella

It is certified that error appears in the above-identified patent and that said Letters Patent is hereby corrected as shown below:

Title Page:

Change the co-inventor's surname to --Masella--.

Signed and Sealed this

Twentieth Day of September, 1988

Attest:

DONALD J. QUIGG

Attesting Officer

Commissioner of Patents and Trademarks